(12) United States Patent
Scheuerer et al.

(10) Patent No.: US 8,181,522 B2
(45) Date of Patent: May 22, 2012

(54) CAPACITIVE ACCELERATION SENSOR HAVING A MOVABLE MASS AND A SPRING ELEMENT

(75) Inventors: Roland Scheuerer, Reutlingen (DE); Heribert Weber, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 12/254,113

(22) Filed: Oct. 20, 2008

(65) Prior Publication Data

US 2009/0100932 A1   Apr. 23, 2009

(30) Foreign Application Priority Data

Oct. 19, 2007 (DE) .......................... 10 2007 050 116

(51) Int. Cl.
*G01P 15/125* (2006.01)
(52) U.S. Cl. .................................. 73/514.32; 73/514.18
(58) Field of Classification Search ............... 73/514.32, 73/514.17, 514.18, 514.36, 514.38, 514.29
See application file for complete search history.

(56) References Cited

U.S. PATENT DOCUMENTS

| | | | | |
|---|---|---|---|---|
| 5,014,554 A | * | 5/1991 | Terada et al. | 73/504.16 |
| 6,149,190 A | * | 11/2000 | Galvin et al. | 280/735 |
| 6,634,232 B1 | * | 10/2003 | Rettig et al. | 73/514.15 |
| 7,004,025 B2 | * | 2/2006 | Tamura | 73/511 |
| 7,121,141 B2 | * | 10/2006 | McNeil | 73/514.32 |
| 7,562,573 B2 | * | 7/2009 | Yazdi | 73/514.32 |
| 2006/0180896 A1 | | 8/2006 | Martin et al. | |

FOREIGN PATENT DOCUMENTS

| | | |
|---|---|---|
| JP | 10-308519 | 11/1998 |
| JP | 11-230984 | 8/1999 |
| JP | 2007-46927 | 2/2007 |

* cited by examiner

*Primary Examiner* — Helen C. Kwok
(74) *Attorney, Agent, or Firm* — Kenyon & Kenyon LLP (57) ABSTRACT

An acceleration sensor having a mass which is movably supported outside its center of gravity, first electrodes on the mass and second electrodes located at a distance therefrom forming a capacitive sensor in order to determine a change in position of the mass as a function of time. At least one spring element which generates a restoring force when the mass is deflected from its neutral position is provided on the side of the mass facing the capacitive sensor. The mass may be obtained by being exposed from a material layer, and the mass is surrounded, at least at its side faces, by this material.

12 Claims, 8 Drawing Sheets

CAPACITIVE ACCELERATION SENSOR HAVING A MOVABLE MASS AND A SPRING ELEMENT

CROSS REFERENCE

This application claims the benefit under 35 U.S.C. §119 of German Patent Application 102007050116.3, filed on Oct. 19, 2007, which is expressly incorporated herein by reference in its entirety.

BACKGROUND INFORMATION

In accordance with the present invention, an acceleration sensor having a mass is movably supported outside its center of gravity, first electrodes on the mass and second electrodes being located at a distance therefrom forming a capacitive sensor in order to determine a change in position of the mass as a function of time. At least one spring element which generates a restoring force when the mass is deflected from its neutral position is provided on the side of the mass facing the capacitive sensor. These types of acceleration sensors are used in motor vehicles, for example, to activate safety devices, or in portable devices to detect an impact load, for example as the result of falling.

An acceleration sensor of this type is described in U.S. Patent Application No. 2006/0180896 A1. This acceleration sensor contains a generally cuboidal mass which is fixed to a base plate using at least one spring element. Located between the base plate and the elastically supported mass is at least one pair of electrodes, which, as a plate capacitor having a variable plate distance, allows the motion of the mass to be capacitively measured. If more than one pair of electrodes is provided, it is possible to detect not only a lifting of the mass from the base plate, but also a tilting or rotation. An acceleration measurement may thus be carried out in more than one spatial direction.

However, a disadvantage of this is that tilting of the oscillatingly supported mass at its base surface causes only a slight change in distance and therefore generates only a small detection signal. The accuracy of detecting accelerations which do not act perpendicular to the base surface of the mass is therefore low. Furthermore, this sensor cannot be installed in a molded housing without limiting the movability of the mass used for the detection. It is no longer possible to detect accelerations as soon as the gap present between the base plate and the mass is filled with housing material. For this reason, the costly, large housing illustrated in FIG. 4 of U.S. Patent Application No. 2006/0180896 A1 is used. Installation in small, transportable devices having a high component packing density is therefore difficult.

An object of the present invention is to provide an acceleration sensor having improved detection accuracy in all three spatial directions. A further object of the present invention is to provide an acceleration sensor which may be installed in a compact, easily manufacturable housing.

The object may be achieved according to an example embodiment of the present invention by use of an acceleration sensor having a mass which is movably supported outside its center of gravity, first electrodes on the mass and second electrodes located at a distance therefrom forming a capacitive sensor in order to determine a change in position of the mass as a function of time, and at least one spring element which generates a restoring force when the mass is deflected from its neutral position being provided on the side of the mass facing the capacitive sensor, the mass being obtainable by being exposed from a material layer and the mass is surrounded, at least at its side faces, by this material.

According to the present invention, it has been found that the oscillatingly supported mass, used for the acceleration measurement, may be exposed from a material layer, for example silicon. The pairs of electrodes used for the distance measurement are situated between the measuring mass and the support substrate, as likewise are the spring elements which are used for support. The mass may have any external shape, for example a cuboidal shape.

To allow high detection accuracy in multiple spatial directions, the elastically supported mass preferably has a suspension on only one base surface. A change in position in a comparatively high amplitude, produced by accelerations parallel or perpendicular to the base surface, is thus possible. A large deflection amplitude results in a large change in capacitance and high measurement accuracy.

To further increase the accuracy, in one specific example embodiment of the present invention the electrodes are structured. In other words, the electrodes are subdivided, and each partial surface may be connected to a separate electronic measuring system for capacitance measurement. When capacitive sensors for distance measurement are situated at two opposite ends of the mass, a tilting of the mass from its neutral position results in a decrease in the distance from one electrode and at the same time results in an increase in the distance from the other electrode. The accuracy of the measurement may be further increased by simultaneous measurement and comparison of the two values.

In one specific embodiment, the mass may also be suspended within an axis of symmetry but outside its center of gravity. As a result, only a single suspension using one spring element is necessary. An asymmetrical sensor response due to spring elements having designs which are not exactly identical is thereby avoided. In addition, further miniaturization is possible on account of the reduced space requirements for only one elastic support.

A micromechanical spring element for elastic support of the measuring mass may be produced according to the present invention by the mass having a cavity which is sealed by a diaphragm made of the same or different material. The mass is then mounted on the substrate using a thin web or a column which engages with the diaphragm. The diaphragm which seals the cavity thus forms a spring element, which may completely close off the cavity, or may be separated from the base surface of the mass at one or more boundary lines of the cavity. The spring constant of the suspension may be adjusted in this manner. For a particularly soft suspension which allows measurement of very small accelerations, multiple cavities having multiple diaphragms as the spring element may be situated one on top of the other. These may be provided in a line or be laterally offset. Furthermore, the spring constant may be adjusted over the thickness of the diaphragm. Thus, numerous parameters are available to one skilled in the art to optimally adapt the acceleration sensor according to the present invention to the intended purpose.

BRIEF DESCRIPTION OF THE DRAWINGS

The micromechanical production of the acceleration sensor according to the present invention by etching a silicon substrate is explained below as an exemplary embodiment, with reference to the figures. This is to be regarded only as an exemplary embodiment of the present invention, which does not limit the subject matter. The present invention allows other embodiments which are likewise effective.

DETAILED DESCRIPTION OF EXAMPLE EMBODIMENTS

Figure 1:
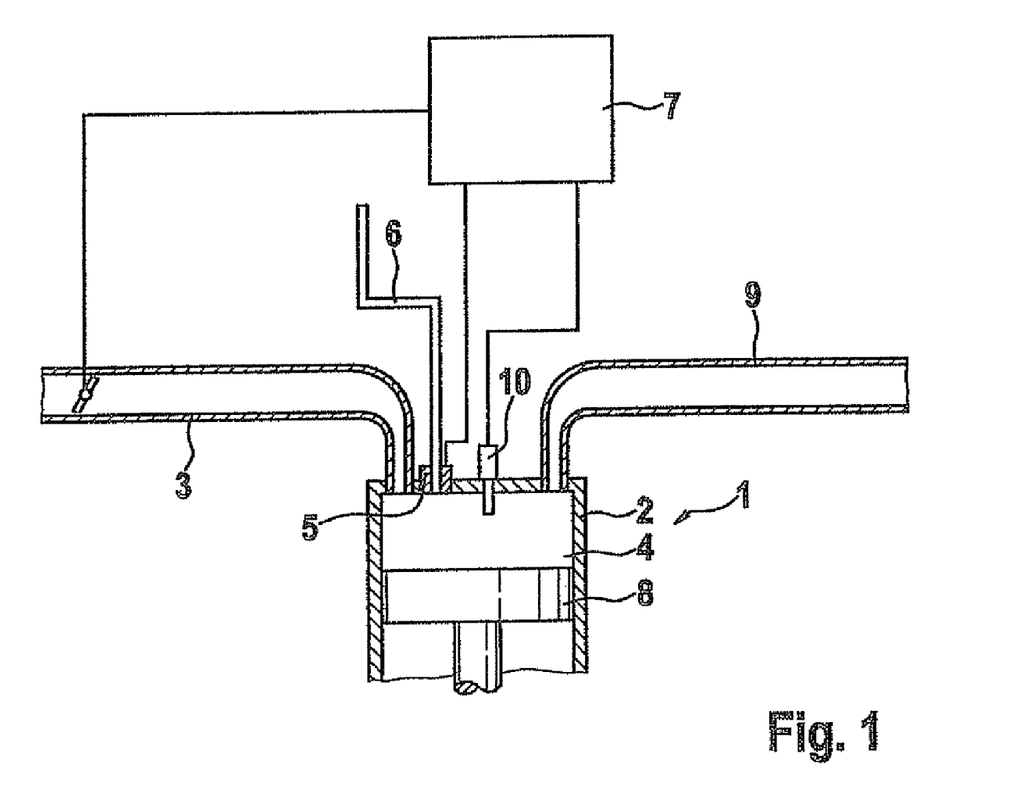
FIGS. 1 through 6 show the production steps for an acceleration sensor according to the present invention, with reference to one specific exemplary embodiment.

FIG. 1 shows the first production step of an acceleration sensor according to the present invention. For this purpose, a silicon wafer 1 having an insulating layer 2 is provided. Printed conductors 3 are deposited on this insulating layer. Insulating layer 2 may be made of silicon oxide, silicon nitride, or silicon oxynitride, for example. Various conventional methods in the semiconductor technology are available for depositing the insulating layer. For example, the silicon substrate may be brought to elevated temperature in an oxygen atmosphere in order to oxidize the surface.

Printed conductors 3 are composed of a conductive material, for example a metal or alloy, or conductively doped silicon. This conductive layer may be deposited using the LPCVD or PECVD process, epitaxial growth, vapor deposition, or sputtering. Printed conductors 3 have structuring to allow the finished sensor to be electrically contacted via the printed conductors.

For the structuring, a mask composed of a photoresist may be used which is applied before deposition of the metal layer. The surface regions which are not intended to be provided with metal plating are thereby protected from the metal deposition by use of the resist. Alternatively, a full-surface metal plating may be applied which is subsequently structured. In this case the printed conductors are protected using a photoresist, and the unprotected regions are freed from the metal plating in an etching step.

A sacrificial layer 4 is applied as the third step. This is a layer, for example $SiO_2$, which may be etched using a gas phase etching process. Contact holes 5 at which metal plating 3 is exposed are in turn introduced into this sacrificial layer. These contact openings 5 may also be produced using a photoresist mask, as well as plasma etching or wet chemical etching of sacrificial layer 4, which is first applied over the full surface. Sacrificial layer 4 is also used as a stop layer for trench structures 10 to be subsequently produced.

Figure 2:
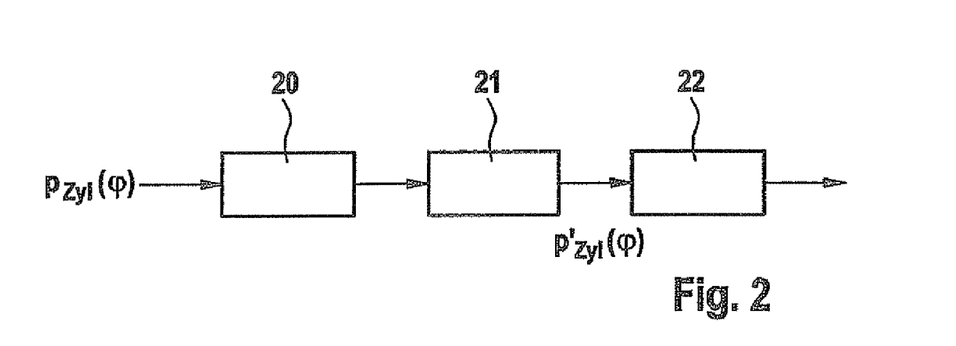

FIG. 2 shows the next two method steps. A first silicon layer 6 is deposited on the substrate according to FIG. 1. This silicon layer later forms the exterior of movably supported mass 15 and diaphragm 17 over cavity 12 provided in the mass. Thus, the thickness of silicon layer 6 also defines the spring constant of the spring elements on which measuring mass 15 is supported. Since the mass may be used at the same time as a counterelectrode for the capacitive sensors, silicon layer 6 may be doped beforehand. This allows measuring mass 15 to be electrically contacted in a particularly simple manner.

An additional etch stop layer 7 composed of $SiO_2$, for example, is deposited on silicon layer 6, which covers the full surface of substrate 1 together with insulating layer 2, printed conductors 3, and sacrificial layer 4. This etch stop layer 7 is used in the subsequent method step as a sacrificial layer for forming cavities 12 in measuring mass 15, and at the same time is used as a stop layer for trench structures 11 to be subsequently produced. By use of a photoresist mask and plasma or wet chemical etching, etch stop layer 7 is thus structured in such a way that $SiO_2$ is present only in the surface regions in which the spring elements for the measuring mass are to be subsequently provided.

Figure 3:
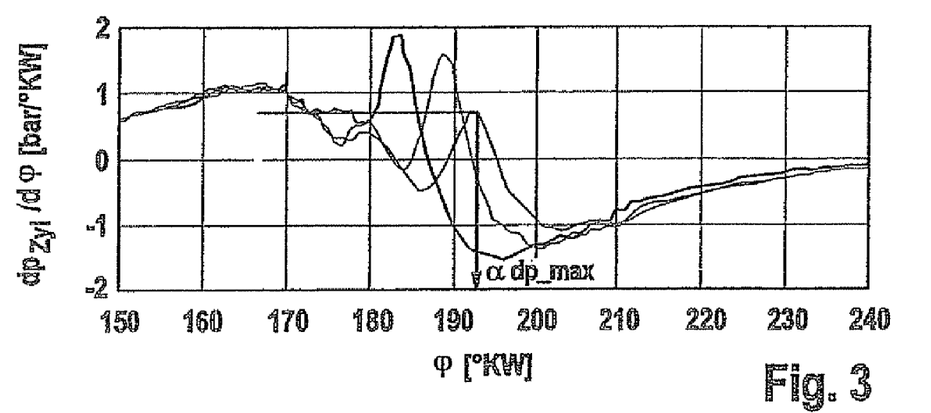

According to FIG. 3, an additional silicon layer 8 is deposited on the substrate according to FIG. 2. It is advantageous for this silicon layer 8 to be conductively doped. Of course, silicon layer 8 may also be deposited undoped as an intrinsic silicon material. In this case, only the regions of silicon layer 8 in which conductivity is required for operation of the acceleration sensor are doped. Layers 6 and 8 preferably form a homogeneous layer having embedded oxide layers 7. Layers 6 and 8 are considered to be homogeneous when the boundary surface between these layers cannot be detected with reasonable effort.

Electrically conductive contacts 9 are applied over silicon layer 8, which has been deposited over the full surface. These contacts are located at defined points at which the acceleration sensor is later to be connected to an external circuit. Metal plating 9 may be produced, for example, as a bond pad made of a metal or an alloy. Alternatively, the sensor may be contacted using conductively doped polysilicon layers 9. Generally conventional layers or layer sequences and manufacturing methods may be used for producing contact 9.

Figure 4:
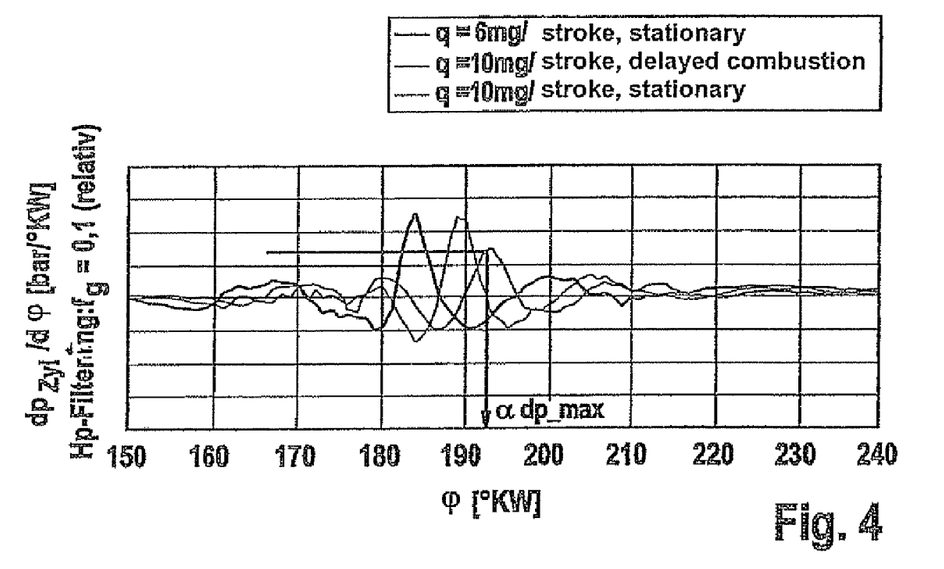

FIG. 4 shows the cross section from FIG. 3 after multiple trenches have been etched into silicon layer 8. These trenches include, for example, oblong trenches 10 which extend along the outer boundary surface of the measuring mass or which expose bond pads 9 from surrounding silicon material 8. Additional etching channels or trenches 11 are also present within the mass to be exposed, which may also have an oblong cross section, or may have a different cross section such as a circular cross section, for example. The shape and position of the trenches is determined by a mask, for example a photoresist mask, or a structured layer composed of an oxide, a nitride, or an oxynitride. $SiO_2$ is preferentially considered for the mask. A single etching mask is sufficient, provided that all trenches are etched in a single method step.

Etched trenches 10 and 11 are produced by chemically selective etching in such a way that in each case the trenches end on an $SiO_2$ layer situated therebelow, either on sacrificial layer 7 or sacrificial layer 4.

Figure 5A:
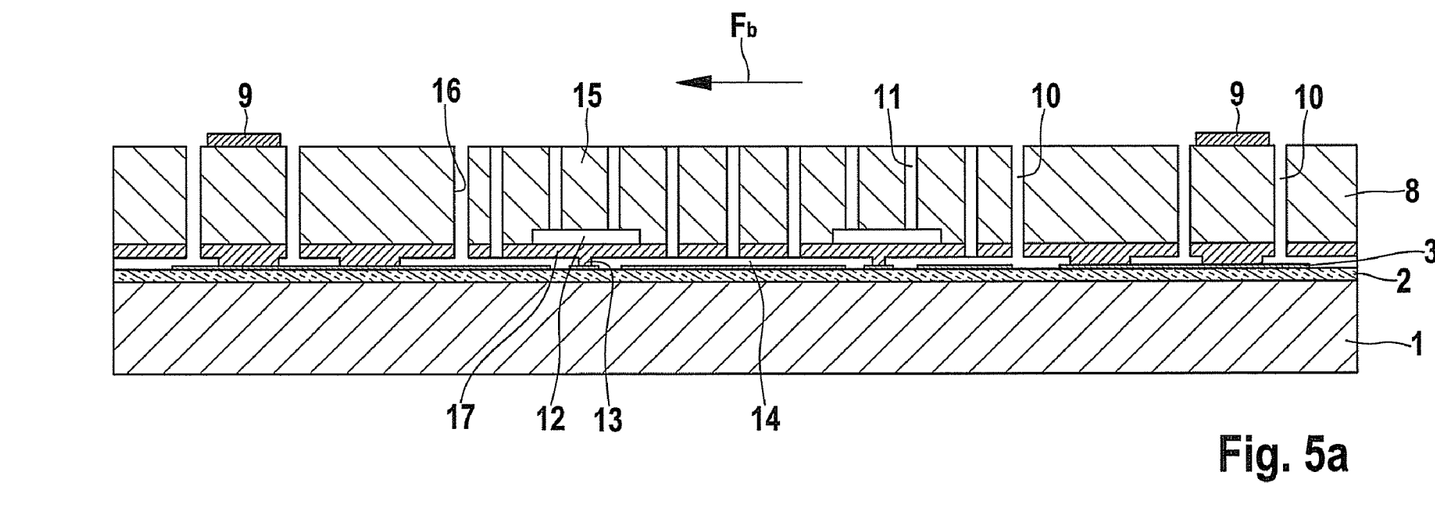

As shown in FIG. 5a, the sacrificial layers are subsequently removed through trench structures 10 and 11. This is carried out, for example, by gas phase etching using gaseous hydrofluoric acid (HF). As a result of removing sacrificial layer 4 beneath measuring mass 15, a cavity 14 is formed between measuring mass 15 and printed conductors 3. Column-shaped elements 13 composed of silicon which originally were deposited in contact openings 5 remain inside cavity 14. The mass is surrounded by boundary surfaces 16 which likewise have been formed from layer 8.

A cavity 12 is formed within mass 15 as the result of removing sacrificial layer 7. Cavity 12 is sealed by a diaphragm 17 which is formed from sections of silicon layer 6. Due to trenches 10 and cavity 14 an exposed mass 15 thus results which is supported on bases 13 via spring element 17, 12.

Provided that mass 15 and first silicon layer 6 are composed of conductively doped silicon, mass 15 may be connected to a printed conductor 3 via spring elements 17 and base 13. Mass 15 may thus be used as a common counterelectrode for all capacitive distance sensors. To measure an acceleration which acts generally perpendicular to the surface of substrate 1, an electrode which has been exposed from metal plating 3 is situated beneath mass 15 on the opposite side of cavity 14. Thus, the distance of mass 15 from substrate 1 may be capacitively measured with great accuracy.

An acceleration which acts on mass 15, parallel to the surface of substrate 1, causes mass 15 to tilt. If, for example, an acceleration force $F_b$ acts to the left, trench 10 to the right of mass 15 becomes wider, and the trench to the left of mass 15 becomes narrower. Likewise, gap 14 becomes smaller on one side of the mass and becomes larger on the other side. This change may be measured using appropriately positioned electrodes 3.

Figure 5B:
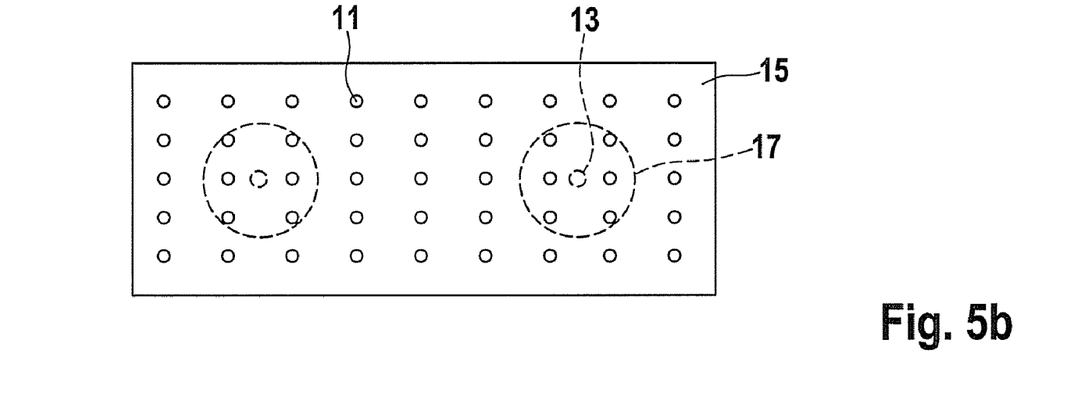

FIG. 5b shows a top view of exposed mass 15. Two circular diaphragms 17, each of which delimits an approximately circular cylindrical cavity 12, are indicated by dashed lines. A fastening element 13 is situated on each diaphragm. The fastening element may have any desired position and shape. In addition, more than one fastening element may be present on each diaphragm. Sacrificial layers 7 and 4 are removed through etching channels 11 to produce cavity 12.

Figure 6:
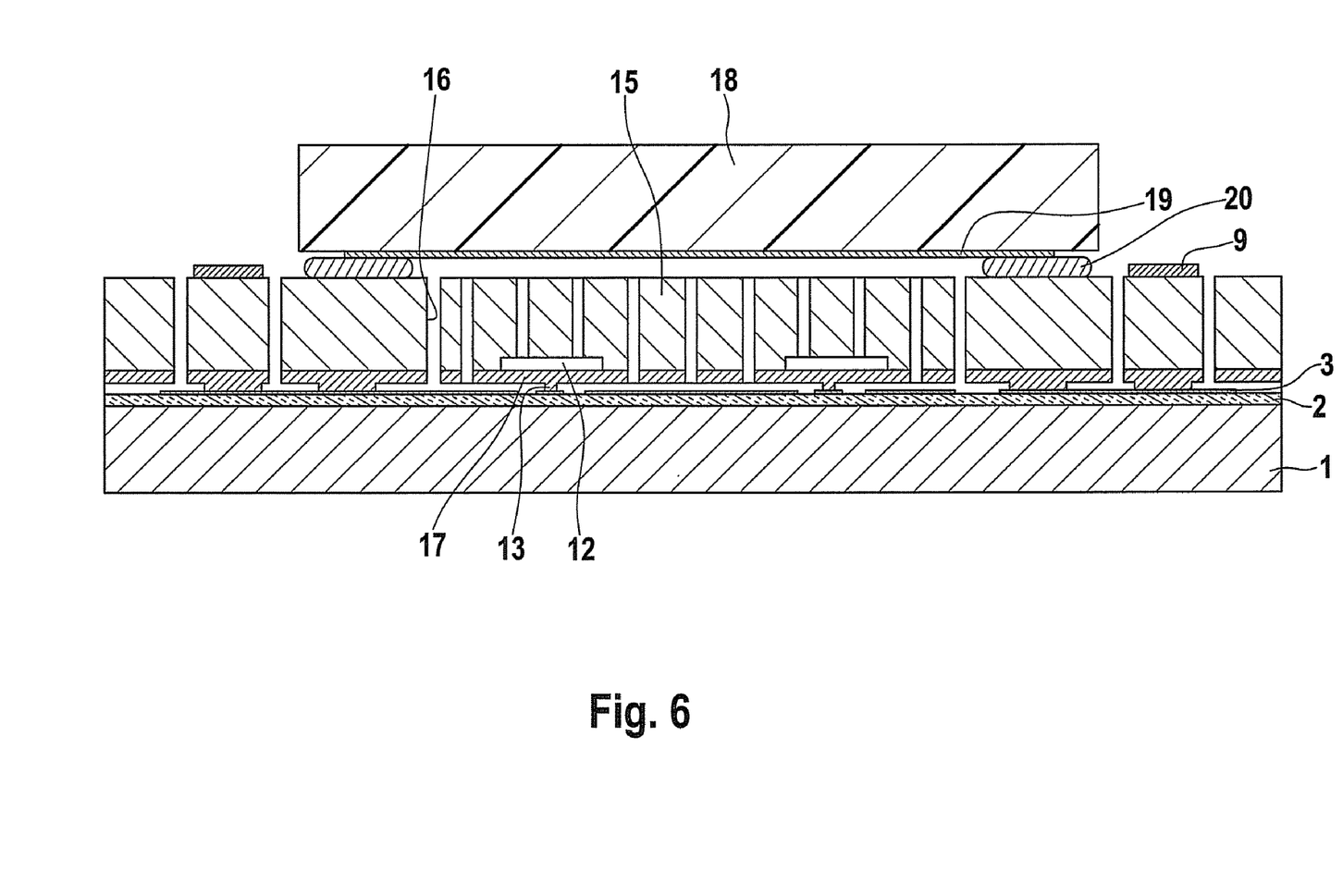

FIG. 6 shows one alternative embodiment of the acceleration sensor. The embodiment according to FIG. 6 differs from that of FIG. 5 in that the region around movably supported mass 15 is enclosed by a cap 18. The penetration of casting compound during installation of the sensor in a housing is thus reliably prevented. The internal pressure in the cavity may be adjusted if the cap hermetically seals the cavity having mass 15. Thus, for example, the damping of the motion of mass 15 as the result of friction against the gas may be decreased by reducing the internal pressure.

On a case-by-case basis a conductive coating 19, for example metal plating, may be provided on cap 18. If a conductive coating 19 is intended to be separated from a conductive cap 18, an insulating coating may be provided between the two sections. In this manner cap 18 may be used as a shield, and coating 19 may be used as a measuring electrode. This metal plating 19 acts as an electrode, and together with conductive mass 15 capacitively determines the distance of mass 15 from cap 18. When an acceleration force acts perpendicular to the surface of substrate 1 the distance between mass 15 and cap 18 is thus decreased, whereas the distance between mass 15 and substrate 1 is increased. The reliability of the sensor may be increased by capacitive measurement of both distances. By subdividing the metal plating and electrically contacting the partial surfaces, the tilting of mass 15 resulting from the acceleration parallel to the surface may be evaluated by differential capacitive means.

Cap 18 may be affixed to silicon layer 8 using either insulating elements 20 or a conductive spacer 20. In the latter case, counterelectrode 19 is contacted via conductive spacer 20, silicon layer 8, and metal plating 3. In a further embodiment counterelectrode 19 may also be contacted within the hermetically sealed housing region.

Figure 7:
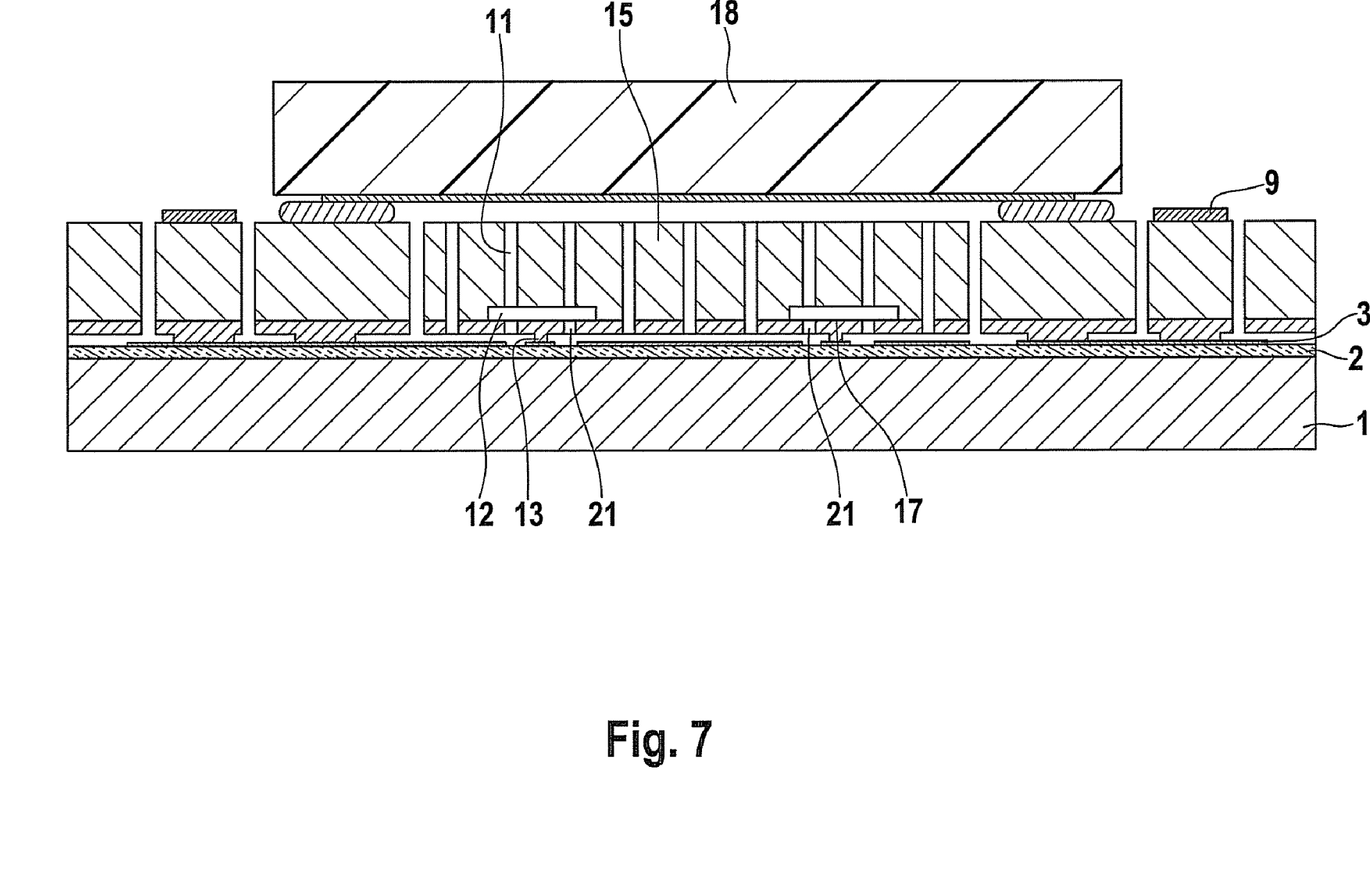
FIG. 7 shows one alternative embodiment of the acceleration sensor having a perforated spring structure.

FIG. 7 shows one alternative embodiment of the spring elements in cross section. Sacrificial layer 7 is provided with multiple holes. As a result, holes 11 in mass 15 extend through cavity 12 and into diaphragm 17. Diaphragm 17 thus has passages 21. These passages 21 change the elasticity of diaphragm 17. For producing these holes, in a further embodiment holes may be etched into first silicon layer 6 before etch stop layer 7 is deposited. This provides the possibility of also introducing depressions in diaphragm 17 which do not completely penetrate the diaphragm. The sensitivity of the sensor element may be adapted to the requirements of the particular application via the passages or depressions.

Figure 8A:
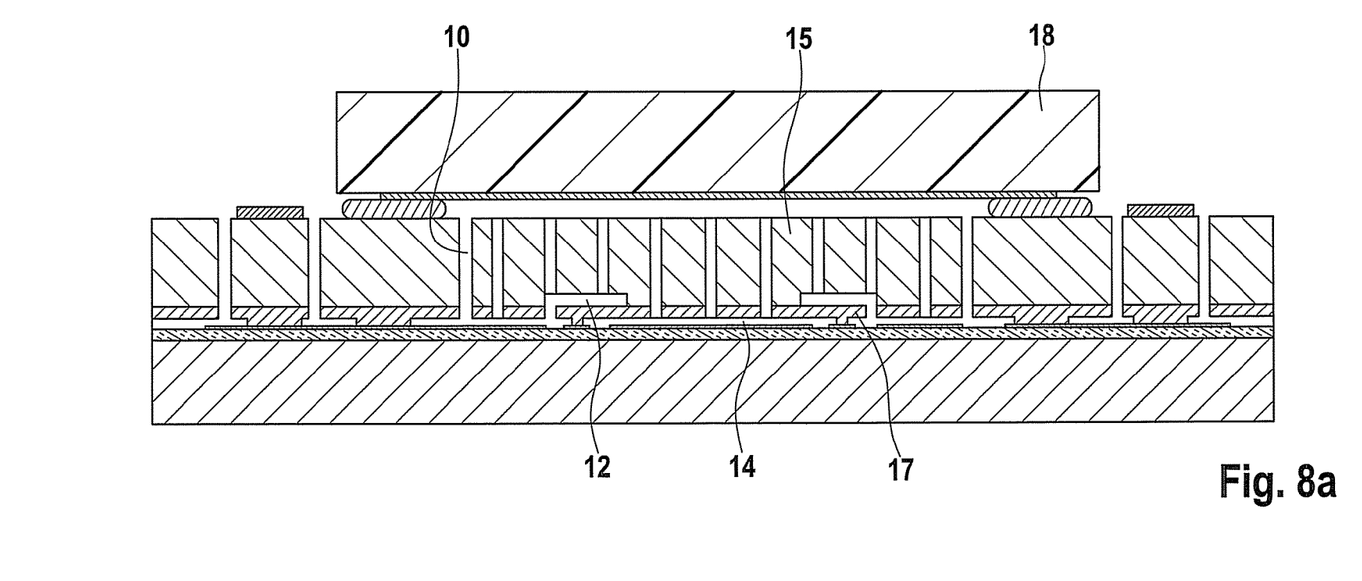
FIG. 8 shows a further embodiment of the present invention having a softer spring constant.

The exposed spring structure according to FIG. 8 is also used for the same purpose. FIG. 8a shows a cross section of measuring mass 15. The cross section reveals that diaphragm 17 has an opening 22 between cavity 12 and gap 14. This is achieved by opening silicon layer 6 down to sacrificial layer 4 and filling this depression with the material of the sacrificial layer. Thus, this material is also etched when the sacrificial layer is removed.

Figure 8B:
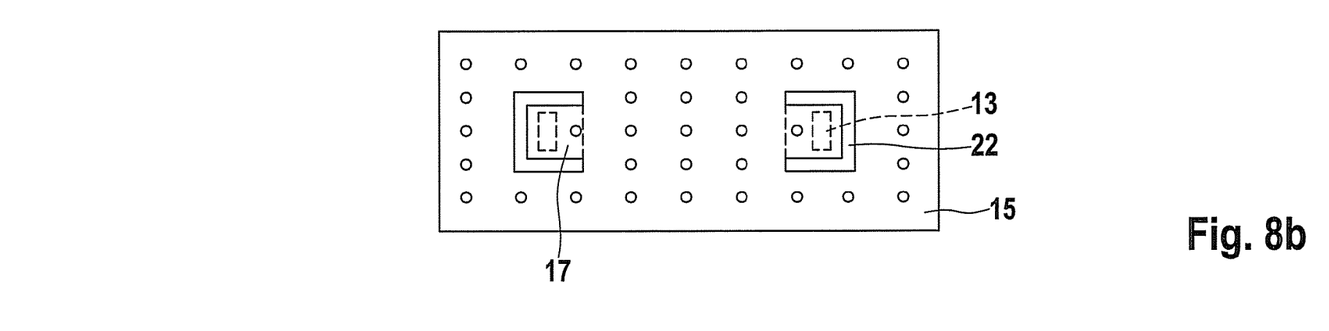

The top view according to FIG. 8b shows a further embodiment having a cavity 12, which in this case has an approximately square outline. Diaphragm 17, which delimits cavity 12, is separated from the base area of mass 15 on three sides of the square by a gap 22. Diaphragm 17 thus forms a flexible spring suspended on one side. Fastening element 13 is adapted to the geometries of cavity 12 and diaphragm 17, and has an essentially rectangular cross section.

Figure 9A:
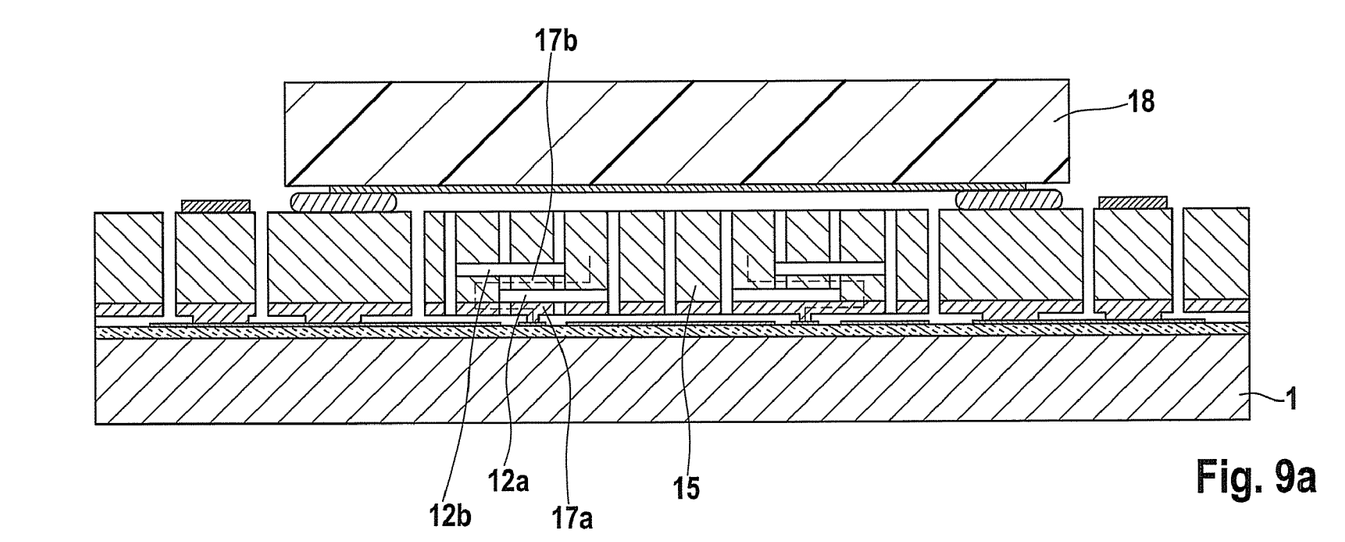
FIG. 9 shows one specific embodiment having a two-stage spring structure.
Figure 9B:
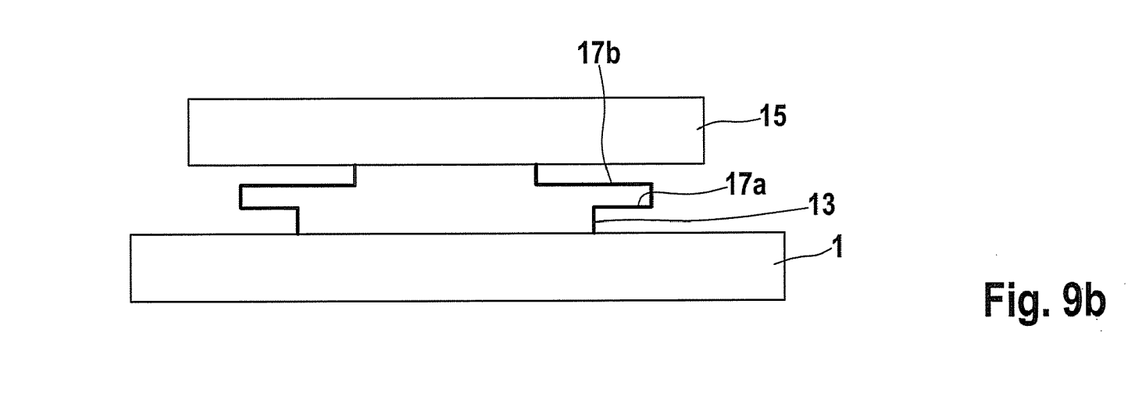

FIG. 9a shows a two-stage spring structure having two cavities 12a and 12b which are sealed by diaphragms 17a and 17b, respectively. The schematic illustration according to FIG. 9b shows that each diaphragm forms a flexible spring which is fixed at one end. The cascading system results in a softer response of the spring, which allows the sensitivity of the acceleration sensor to be adjusted to mass 15.

A further embodiment of the present invention includes elastically suspended stop structures which are introduced into substrate wafer 1. These stop structures prevent a severe impact on mass 15 in the event that an excessively large acceleration force acts on the acceleration sensor.

Of course, the example embodiments of the present invention are not limited to the examples illustrated herein. Rather, on a case-by-case basis one skilled in the art will also combine various of the exemplary embodiments described herein.

What is claimed is:

1. An acceleration sensor, comprising:
    a mass which is movably supported outside a center of gravity of the mass;
    first electrodes on the mass and second electrodes located at a distance therefrom forming a capacitive sensor in order to determine a change in position of the mass as a function of time; and
    at least one spring element which generates a restoring force when the mass is deflected from a neutral position, the at least one spring element being provided on a side of the mass facing the capacitive sensor;
    wherein the mass is obtained by being exposed from a material layer, and the mass is surrounded, at least at side faces, by a material of the material layer, and wherein at least one cavity is provided in the mass, and wherein the cavity is sealed by a diaphragm having a supporting base, and wherein the at least one spring element is formed by the cavity and the diaphragm.

2. The acceleration sensor as recited in claim 1, wherein capacitive sensors are provided at two oppositely situated boundary surfaces of the mass.

3. The acceleration sensor as recited in claim 1, wherein at least one of the first electrodes on the mass and the second electrodes located at a distance therefrom, have lateral structuring.

4. The acceleration sensor as recited in claim 1, wherein the diaphragm is integrated as one piece into an outer boundary surface of the mass.

5. The acceleration sensor as recited in claim 4, wherein only one partial section of a boundary line of the diaphragm is integrally joined to the outer boundary surface of the mass.

6. The acceleration sensor as recited in claim 1, wherein the at least one spring element has a plurality of cavities which are separated by diaphragms, respectively.

7. The acceleration sensor as recited in claim 1, wherein the mass has precisely one spring element which engages with an axis of symmetry outside the center of gravity of the mass.

8. The acceleration sensor as recited in claim 1, wherein the mass is situated in a cavity which is closed on all sides.

9. The acceleration sensor as recited in claim 8, wherein a pressure in the cavity differs from atmospheric pressure, and is less than atmospheric pressure.

10. A method of using an acceleration sensor, the acceleration sensor including a mass which is movably supported outside a center of gravity of the mass, first electrodes on the mass and second electrodes located at a distance therefrom forming a capacitive sensor in order to determine a change in position of the mass as a function of time, and at least one spring element which generates a restoring force when the mass is deflected from a neutral position, the at least one spring element being provided on a side of the mass facing the capacitive sensor, wherein the mass is obtained by being exposed from a material layer, and the mass is surrounded, at least at its side faces, by a material of the material layer, the method comprising:

measuring, using the acceleration sensor, a lateral acceleration in three spatial directions, wherein at least one cavity is provided in the mass, and wherein the cavity is sealed by a diaphragm having a supporting base, and wherein the at least one spring element is formed by the cavity and the diaphragm.

11. A motor vehicle having an acceleration sensor, the acceleration sensor comprising:

a mass which is movably supported outside a center of gravity of the mass;

first electrodes on the mass and second electrodes located at a distance therefrom forming a capacitive sensor in order to determine a change in position of the mass as a function of time; and at least one spring element which generates a restoring force when the mass is deflected from a neutral position, the at least one spring element being provided on a side of the mass facing the capacitive sensor;

wherein the mass is obtained by being exposed from a material layer, and the mass is surrounded, at least at side faces, by a material of the material layer, and wherein at least one cavity is provided in the mass, and wherein the cavity is sealed by a diaphragm having a supporting base, and wherein the at least one spring element is formed by the cavity and the diaphragm.

12. The acceleration sensor as recited in claim 1, wherein the at least one spring element engages with only one outer boundary surface of the mass for supporting the movably supported mass.

\* \* \* \* \*